United States Patent Office 3,433,341
Patented Mar. 18, 1969

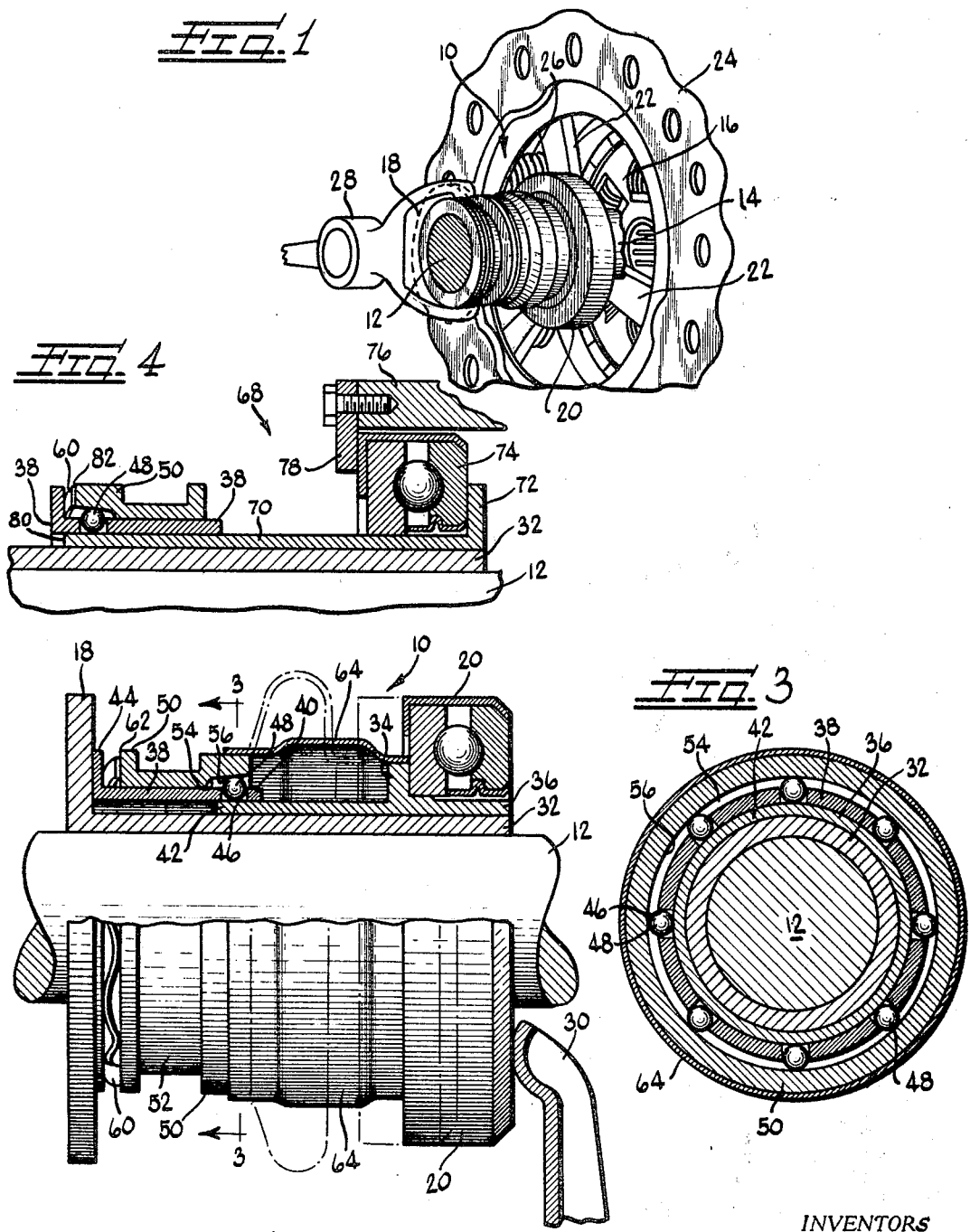

3,433,341
SELF-ADJUSTING CLUTCH RELEASE BEARING ASSEMBLY
Martin C. Bohn, Highland Park, John F. Brady, Chicago, John O. Spinello, Blackhawk Heights, and Kenneth G. Rice, Evergreen Park, Ill., assignors to Chicago Clutch Manufacturing Co., Inc., Chicago, Ill., a corporation of Illinois
Filed May 11, 1967, Ser. No. 637,767
U.S. Cl. 192—111            4 Claims
Int. Cl. F16d 11/00, 13/60, 19/00

ABSTRACT OF THE DISCLOSURE

A self-adjusting clutch release bearing assembly for automatically repositioning the clutch release bearing as the clutch disc facing wears. A controlled collapsible or extendible clutch release bearing carrier with ball bearings retained in an angled cavity of a sleeve member surrounding one end of the carrier, permitting the assembly to controllably collapse or extend to reposition the release bearing with respect to the clutch; and also enabling the assembly to move in a unitary manner during disengagement of the clutch.

Field of the invention

This invention relates to clutch release bearings or throw-out bearings, and in particular to a self-adjusting clutch release bearing assembly for automatically compensating for wearing of the clutch disc facing.

Description of the prior art

In direct pressure type clutches, the release bearing or throw-out bearing is utilized to operate the clutch release levers by actuation of the clutch release fork, so as to disengage the driven clutch disc from the driving flywheel and pressure plate. As the clutch disc facing wears, the clutch pressure springs move the pressure plate closer to the flywheel.

In one form of such clutches, this forces the pivoting clutch release levers into direct pressure engagement against the throw-out bearing, and binds the bearing against the release fork. In another form of such clutches, the clutch release levers exert a pulling tension on the throw-out bearing as the clutch disc facing wears.

To alleviate this binding or pulling tension, an adjustment is made to the angle of the clutch release fork, so as to reposition the throw-out bearing until the pressure from the clutch release levers is released.

In most trucks utilizing direct pressure clutches, this mechanical readjustment of the clutch release fork is required approximately every 1 to 3 months. If the readjustment is not performed, continued wear of the clutch disc facing forces the clutch release levers harder against the throw-out bearing (or exerts more pulling tension—in other direct pressure clutches), which can lead to eventual bearing seizure and eventual burning of the clutch release levers and of subsequent damage to the clutch itself. Prior art attempts have been made to automatically adjust the angle of the clutch release fork as the clutch disc facing wears, but such attempts have not been successful and have not been utilized commercially to any great extent.

Summary of the invention

Therefore, in accordance with the principles of the present invention there is provided a self-adjusting clutch release bearing assembly which automatically repositions the release bearing to compensate for wear in the clutch disc facing.

In one aspect of the present invention, there is provided a clutch release bearing assembly which operates as a normal unitary structure during disengagement of the clutch, that is, when the clutch release levers are operated by movement of the clutch release fork; and which operates in a controlled collapsing or extending manner to reposition the throw-out bearing when the clutch is engaged, so as to automatically compensate for wear in the clutch disc facing.

In the preferred embodiment of this invention, a plurality of ball bearings are retained within an inner sleeve member which overlaps one end of a throw-out bearing carrier, with the ball bearings being captured between an angled cavity in an outer sleeve member and the overlapped portion of the bearing carrier. The angled cavity is arranged such that operation of the clutch release fork to disengage the clutch moves the entire release bearing carrier assembly as a unitary structure to depress the clutch release levers. However, when the clutch is engaged, the release bearing carrier can slide within the inner sleeve member to controllably collapse or extend the bearing assembly as the clutch release levers are forced against the release bearing by wear of the clutch disc facing.

Brief description of the drawings

The invention will be better understood from the following detailed description thereof taken in conjunction with the accompanying drawings in which:

FIGURE 1 is a perspective view illustrating the self-adjusting collapsible clutch release bearing assembly embodiment of this invention, with the release bearing at the clutch end of the assembly immediately adjacent the clutch release levers, and the other end of the bearing assembly engaged by the clutch release fork;

FIGURE 2 is an elevational view, partly in section, illustrating a self-adjusting collapsible clutch release bearing assembly constructed in accordance with the principles of the present invention;

FIGURE 3 is a sectional view taken along the section line III—III of FIGURE 2; and FIGURE 4 is a sectional view of an alternative embodiment of the present invention, illustrating an extendible release bearing assembly in the substantially fully extended position.

Description of the preferred embodiments

Referring now to FIGURE 1, there is illustrated a self-adjusting collapsible clutch release bearing assembly 10 constructed in accordance with the principles of the present invention. While the bearing assembly shown in the drawings is collapsible, for corresponding use with the direct pressure type clutch most commonly used, it is to be understood that an extendible bearing assembly for use with other types of direct pressure clutches is also within the scope of the invention.

The collapsible bearing assembly 10 is mounted to a clutch shaft 12. The clutch shaft 12 has one end 14 extending into a clutch disc 16, with the other end extending into a transmission (not shown) in a well-known manner. For purposes of illustration, the transmission main drive gear retainer 18 is shown in dashed lines, it being understood that the retainer 18 is fixed in position in the following description of the invention.

At the clutch end of the release bearing assembly there is mounted a release bearing or throw-out bearing 20 immediately adjacent a number of clutch release levers 22 which are pivotally mounted to a clutch cover 24. A series of pressure springs 26 mounted between the clutch cover 24 and a pressure plate (not shown) maintain the clutch normally engaged, with the pressure plate in intimate contact with the clutch disc 16.

In a well-known manner, for the type of clutch shown in FIGURE 1, disengagement of the clutch, that is, moving the pressure plate towards the clutch cover so as to remove the plate from intimate contact with the clutch disc 16, is accomplished by depression of the clutch release levers 22. Depression of the clutch release levers 22 is provided by operating the vehicle clutch pedal which is suitably linked to a clutch release fork 28. This action moves the clutch release assembly 10 into contact with the release levers 22, so as to depress the levers and thereby disengage the clutch. Engagement of the clutch is again accomplished by releasing the vehicle clutch pedal to thereby release the bearing assembly 10 from contact with the clutch release levers 22.

In the engaged position of the clutch, the position of the clutch release levers 22 is a function of the amount of wear in the facing of the clutch disc. That is, as the clutch disc facing wears, the lever end 30 (see FIGURE 2) of the pivoting clutch release levers 22 moves farther out of the clutch assembly in a direction towards the release fork 28 and the transmission. Since the release bearing assembly 10 is maintained in position immediately adjacent the clutch release levers 22 by means of the clutch release fork 28, continued wear of the clutch disc facing increases the outward pressure of the release levers 22 on the release bearing 20. In prior art one piece release bearings, this required a readjustment in the fork linkage to move the bearing towards the transmission. Failure to periodically readjust the bearing position would lead to seizure of the release bearing and eventual damage to the clutch itself.

In accordance with the principles of the present invention, there is provided a self-adjusting clutch release bearing assembly 10 which eliminates the requirement for periodically adjusting the position of the release bearing. Referring to FIGURE 2 there is illustrated the preferred embodiment of this invention. As shown in FIGURE 2, the release bearing assembly 10 is slidably mounted on a cylindrical extension 32 of the transmission main drive gear retainer 18, such that the release bearing 10 is positioned between the retainer 18 and the clutch release levers 22. As described previously the clutch shaft 12 extends through the stationary gear retainer 18 and the extension 32 so as to couple into and be rotated by the clutch disc 16 when the clutch is in an engaged position. A standard type of release bearing 20 is mounted against a stop 34 protruding orthogonally from a cylindrical release bearing carrier 36 which slidably engages the extension 32 of gear retainer 18.

An inner sleeve member 38 includes an apertured end portion 40 overlapping the transmission end 42 of the release bearing carrier 36. The inner sleeve member 38 includes an upright section 44 which butts against the main drive gear retainer 18.

Retained within each of the apertures 46 in the end portion 40 of the inner sleeve member 38 is a ball bearing 48. In slidable engagement with the inner sleeve member 38 is an outer sleeve member 50 having a groove 52 therein for receiving the clutch release fork 28. The inner sleeve member can be formed of brass and the outer member 50 of steel, or suitable coatings can be applied to provide low sliding friction between the two members. A cavity 54 within the outer sleeve member 50 is arranged to substantially overlap the end portion 40 of the inner sleeve member 38 and the transmission end portion 42 of the release bearing carrier 36.

Referring to FIGURES 2 and 3, it can be seen that the ball bearings 48 engage an angled side wall or ramp 56 of the cavity 54. From FIGURE 2 can be noted that the cavity 54 enlarges in size from the transmission end of the release bearing assembly 10 towards the clutch end. That is, the diameter of the side wall or ramp 56 increases from the inner portion of cavity 54 towards the outer edge 58 of the cavity. It has been found that a side wall angle of approximately 5° with respect to a reference line parallel to the longitudinal axis of the clutch shaft 12, is satisfactory. However, it is to be understood that this invention is not limited to the angle since deviations therefrom are possible and depend of course on the size of the ball bearings and the dimensions of the various components.

A resilient member 60 maintained between the upright portion 44 of the inner sleeve member 38 and a protruding foot 62 of the outer sleeve member 50, urges the side wall 56 into contact with the ball bearings 48 except as hereinafter described. A flexible cover 64 formed of polyethylene, neoprene, or other well-known flexible-type material and suitably cemented or otherwise sealed at its ends to the bearing assembly, prevents dust or other undesirable foreign objects from collecting on the release bearing carrier 36 or within the apertures 46, which may prevent the release assembly 10 from properly collapsing in a controlled manner as the clutch disc facing wears.

In operation of the clutch release assembly as shown in FIGURE 2, the assembly 10 is initially extended its full range such as shown in the solid line position of FIGURE 2, and is installed in the extended position. In this position, the clutch release levers 22 are only slightly touching, with insignificant pressure, against the release bearing 20. As mentioned previously, wearing of the clutch disc facing moves the pivoting clutch release levers 22 in an outward direction and in direct pressure engagement against the release bearing 20.

Assuming that the clutch is engaged, the release fork 28 is arranged to provide a force in the direction of the resilient member 60, sufficient to compress member 60 allowing the disengaging of the balls 48 from the side wall or ramp 56 within cavity 54, and thereby unlocking the the release bearing assembly 10. Increasing pressure of the clutch release lever 22 caused by the wearing of the clutch disc facing, therefore incremently slides the release bearing carrier 36 within the inner sleeve member 38 until the release levers 22 are in their new outward position corresponding to the wear of the clutch disc facing, thereby removing pressure from the release bearing 20. The angled cavity 54 permits the release bearing carrier 36 to slide under pressure from the release levers 22 in a controlled manner, since the ball bearings 48 tend to slowly rotate clockwise or skid towards the increasing diameter outer edge of 58 of the cavity, such as shown in FIGURE 2, as the carrier 36 is urged into the inner sleeve member.

The release bearing 20 is thus moved to its new position as shown by the dashed lines in FIGURE 2, as the release levers assume their new position. The dashed line position of the release bearing 20 is merely indicated for illustration, since normally the release bearing will be moved much smaller distances during the repositioning process as the clutch disc wears.

It must be appreciated that although there has been provided in accordance with this invention, the controlled collapsing of the release bearing assembly to reposition the bearing carrier, the release bearing assembly 10 is yet able to act as a unitary structure when disengagement of the clutch is desired by depression of the clutch levers 22. This is accomplished in the following manner. Depression of the vehicle clutch pedal to move the clutch release fork 28 toward the clutch urges the smaller inner diameter side wall portion of the cavity 54 against the ball bearings 48. This action securely grips the outer sleeve member 50 to the carrier 36, through the engagement of the ball bearings 48 pressing against the transmission end 42 of the release bearing carrier 36, and thereby locking the entire assembly into a unitary structure. Thus, the release bearing assembly 10 is enabled to move as a one-piece locked or unitary structure towards the clutch release levers 22 to disengage the clutch.

As mentioned previously, in some direct pressure type clutches the clutch release levers are clamped or otherwise secured to one face of the release bearing, and the release bearing is moved away from the clutch to disengage the clutch. As the clutch disc facing wears, the release levers tend to move away from the release bearing and thereby urge the release bearing towards the clutch. However, the release bearing is of course maintained in position by the clutch release fork engaging the transmission end of the release bearing carrier. Periodic adjustments to the fork linkage are therefore required to move the release bearing towards the clutch and eliminate the pull or tension exerted by the clutch springs and levers on the release bearing as the disc facing wears.

It is to be understood that the teachings herein can be adapted to solve the aforementioned problem with this type of clutch by providing an extendible clutch release bearing assembly. With the exception of reversing the angle of cavity 54 in the outer sleeve member 50, so that the cavity has an increasing diameter from the clutch towards the transmission, the extendible clutch release bearing assembly can be constructed quite similar to that shown in FIGURE 2. In particular, reference may be had to FIGURE 4, wherein there is shown an extendible clutch release bearing assembly 68 including a release bearing carrier 70 having a stop 72 against which is mounted a standard type of release bearing 74. The clutch release levers 76 have an extension 78, which engages one end of the release bearing 74.

At the transmission end 80 of the release bearing carrier 70, there is provided an inner sleeve member 38 including a series of ball bearings 48 captured within apertures in the inner sleeve member in a manner similar to the collapsible bearing assembly showin in FIGURE 2. An outer sleeve member 50 similar to that shown in FIGURE 2 is located around the inner sleeve member 38 in a position opposite to that shown in FIGURE 2. It may be particularly noted that the cavity 54 includes an angled side wall or ramp 56 having an inner diameter which increases from the inner portion of cavity 54 towards the outer edge 58 of the cavity facing the transmission. A resilient member 60 is maintained between the upright portion 44 of the inner sleeve member 38 and the outer face 82 of the outer sleeve member 50.

As an alternative embodiment, the extendible bearing assembly can also be constructed by symmetrically locating the inner sleeve member 38 and the outer sleeve member 50 instead of on the transmission end beyond the ball bearings 48, to the clutch end before the ball bearings 48.

In either arrangement, to disengage the clutch, the release fork is moved towards the transmission to move an outer sleeve member, such as sleeve member 50. This enables a decreasing diameter cavity side wall to bear against the ball bearings, thereby locking the carrier into a unitary structure and moving the clutch release levers, which are secured to the release bearing, away from the clutch.

When the clutch is engaged, the release fork provides a slight force against the outer sleeve member and in a direction towards the clutch sufficient to unlock the bearing assembly. Therefore, as the disc facing of this type of clutch wears out, the release levers correspondingly move away from the transmission, thereby pulling the release bearing carrier 70 within the inner sleeve member 38 containing the captured ball bearings 48 in suitable apertures, so as to extend the release bearing assembly. The carrier 70 is moved until the release levers 76 have reached their new position, thereby removing any pulling tension on the bearing carrier. In effect, therefore, the release bearing assembly 68 is controllably extended as the clutch disc facing wears. In the illustration of FIGURE 4, the assembly 68 is shown in almost its furthest extension, indicating wearing of the clutch disc facing. Initially, the assembly 68 would of course be installed in the almost completely collapsed position—that it, with the inner sleeve member 38 closely adjacent to the release bearing 74.

It is to be understood that it is within the skill of the art to utilize the teachings of the present invention to form alternative embodiments, and that therefore the scope of this invention is not to be limited to the preferred embodiments illustrated herein. As an example, a series of grooves can be located in the outer diameter of the release bearing carrier 36 at the transmission end 42 thereof. With a snap-ring maintained within a sleeve member such as sleeve member 38, and the snap-ring engaged in the first of such grooves on the bearing carrier, pressure from the release levers 22 caused by the wearing of the disc facing can succeedingly force the bearing carrier within the sleeve member so as to succeedingly engage the snap-ring in the series of grooves on the bearing carrier.

Alternatively, the series of grooves can be located in a sleeve member such as sleeve member 38, with the snap-ring located in a groove on the outer diameter of transmission end 42 of the release bearing carrier 36. In this manner, pressure from the clutch release levers will force the snap-ring into the grooves in a step by step collapsing manner.

Therefore, the foregoing detailed description has been given for clearness of understanding only, and no unnecessary limitations should be understood therefrom, as modifications will be obvious to those skilled in the art.

What is claimed is:

1. A self-adjusting clutch release bearing assembly operable by a clutch release fork between a prime mover clutch and transmission, said assembly comprising:
   a cylindrical bearing carrier having one end immediately adjacent to the clutch and the other end toward said transmission;
   a clutch release bearing mounted to said bearing carrier at said one end adjacent the clutch;
   an inner cylindrical sleeve member overlapping and circumferentially engaging in slidable contact with said other end of the bearing carrier, said sleeve member extending from said other end of the bearing carrier towards said transmission;
   said inner sleeve member including a plurality of apertures in said overlapping portion and at one end thereof;
   a plurality of ball bearings each retained within a respective aperture in said sleeve member and having a diameter sufficient to engage said bearing carrier immediately below said sleeve member and to project slightly beyond the outer circumference of said sleeve member;
   an outer sleeve member having a cylindrical portion overlapping and in circumferential slidable engagement with said inner sleeve member;
   a locking portion extending from said outer sleeve member at one end thereof and having an annular cavity positioned immediately surrounding said ball bearings;
   said cavity having angled side walls for selectively engaging said ball bearings, said side walls having an enlarging inner diameter facing said clutch release bearing;
   an annular rim projecting transversely from the other end of said outer sleeve member;
   resilient means between said annular rim and said inner sleeve member for urging said cavity side walls in engagement with said ball bearings;
   said clutch release fork engaging said outer sleeve member locking portion to lockingly engage both sleeve members and the bearing carrier during disengagement of the clutch in movement of the bearing carrier towards said clutch; and
   said clutch release fork engaging said outer sleeve member annular rim and urging said outer sleeve member away from said ball bearing and enabling said bearing carrier to move axially with respect to said inner sleeve member during engagement of the clutch, thereby compensating for wearing of the clutch.

2. A self-adjusting clutch release bearing assembly as claimed in claim 1, including a flexible cover sealingly engaged at one end to said bearing carrier, and at the other end to said outer sleeve member for sealing said overlapping portion from undesired foreign objects.

3. A self-adjusting clutch release bearing assembly as claimed in claim 1, wherein said inner sleeve member includes an upright annular section extending outwardly from the other end thereof for maintaining said resilient means against said annular rim.

4. A self-adjusting clutch release bearing assembly as claimed in claim 1, wherein said cavity angled side walls extend at an angle of approximately 5 degrees with respect to a reference line parallel to the longitudinal axis of said bearing assembly.

References Cited

UNITED STATES PATENTS

| | | | |
|---|---|---|---|
| 1,968,274 | 7/1934 | Wemp | 192—111 |
| 2,002,841 | 5/1935 | Tatter | 192—111 |
| 2,421,869 | 6/1947 | Brock. | |
| 3,286,803 | 11/1966 | Zeidler | 192—111 |

BENJAMIN W. WYCKE III, *Primary Examiner.*

U.S. Cl. X.R.

192—98